US012647457B2

(12) United States Patent
Venzin et al.

(10) Patent No.: US 12,647,457 B2
(45) Date of Patent: Jun. 2, 2026

(54) INVALID TRAFFIC DETECTION USING EXPLAINABLE UNSUPERVISED GRAPH ML

(71) Applicant: Oracle International Corporation, Redwood Shores, CA (US)

(72) Inventors: Valentin Venzin, Zurich (CH); Rhicheek Patra, Zurich (CH); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 38 days.

(21) Appl. No.: 18/954,031

(22) Filed: Nov. 20, 2024

(65) Prior Publication Data

US 2025/0119453 A1    Apr. 10, 2025

Related U.S. Application Data

(62) Division of application No. 17/558,342, filed on Dec. 21, 2021, now Pat. No. 12,184,692.

(51) Int. Cl.
*H04L 9/40* (2022.01)
*G06N 20/00* (2019.01)

(52) U.S. Cl.
CPC ......... *H04L 63/1483* (2013.01); *G06N 20/00* (2019.01); *H04L 63/1425* (2013.01)

(58) Field of Classification Search
CPC ............. H04L 63/1483; H04L 63/1425; H04L 63/1441; G06N 20/00; G06N 3/048; G06N 3/084; G06N 3/045; G06N 3/088
See application file for complete search history.

(56) References Cited

U.S. PATENT DOCUMENTS 9,516,053 B1    12/2016    Muddu
11,003,717 B1    5/2021    Eswaran
(Continued)

OTHER PUBLICATIONS

Ying et al., "GNNExplainer: Generating Explanations for Graph Neural Networks", 2019, 13 pages.
(Continued)

*Primary Examiner* — Huan V Doan
(74) *Attorney, Agent, or Firm* — Hickman Becker Bingham Ledesma LLP

(57)    ABSTRACT

Herein are graph machine learning explainability (MLX) techniques for invalid traffic detection. In an embodiment, a computer generates a graph that contains: a) domain vertices that represent network domains that received requests and b) address vertices that respectively represent network addresses from which the requests originated. Based on the graph, domain embeddings are generated that respectively encode the domain vertices. Based on the domain embeddings, multidomain embeddings are generated that respectively encode the network addresses. The multidomain embeddings are organized into multiple clusters of multidomain embeddings. A particular cluster is detected as suspicious. In an embodiment, an unsupervised trained graph model generates the multidomain embeddings. Based on the clusters of multidomain embeddings, feature importances are unsupervised trained. Based on the feature importances, an explanation is automatically generated for why an object is or is not suspicious. The explained object may be a cluster or other batch of network addresses or a single network address.

20 Claims, 10 Drawing Sheets

801 By unsupervised trained graph model, generate multidomain embeddings

802 Organize multidomain embeddings into multiple clusters

803 Based on clusters, unsupervised train all importances

804 Calculate respective centroid of each cluster

805 Measure respective entropy of importances for each multidomain embedding

806 Penalize sum of multiple importances for each multidomain embedding

807 Penalize mid-range importances

808 Calculate first inner product of each multidomain embedding and centroid of particular cluster that contains that multidomain embedding 809 Calculate average of respective inner products of respective centroid of each cluster that is not particular cluster and that multidomain embedding 810 Measure difference between first and average inner products for each multidomain embedding 811 Based on importances, generate explanation why particular cluster or particular multidomain embedding is or is not suspicious

(56) References Cited

U.S. PATENT DOCUMENTS

| | | | |
|---|---|---|---|
| 11,126,493 B2 | 9/2021 | Guha et al. | |
| 11,397,808 B1 * | 7/2022 | Prabhu | G06F 21/566 |
| 2018/0219888 A1 * | 8/2018 | Apostolopoulos | |
| | | | H04L 63/1425 |
| 2018/0336437 A1 | 11/2018 | Cheng | |
| 2019/0132344 A1 | 5/2019 | Lem | |
| 2020/0045049 A1 | 2/2020 | Apostolopolous et al. | |
| 2020/0142957 A1 | 5/2020 | Patra | |
| 2021/0075805 A1 | 3/2021 | Cavallari | |

OTHER PUBLICATIONS

Hamilton et al., "Inductive Representation Learning on Large Graphs", Neural Information Processing Systems, 2017, 19 pages.

* cited by examiner

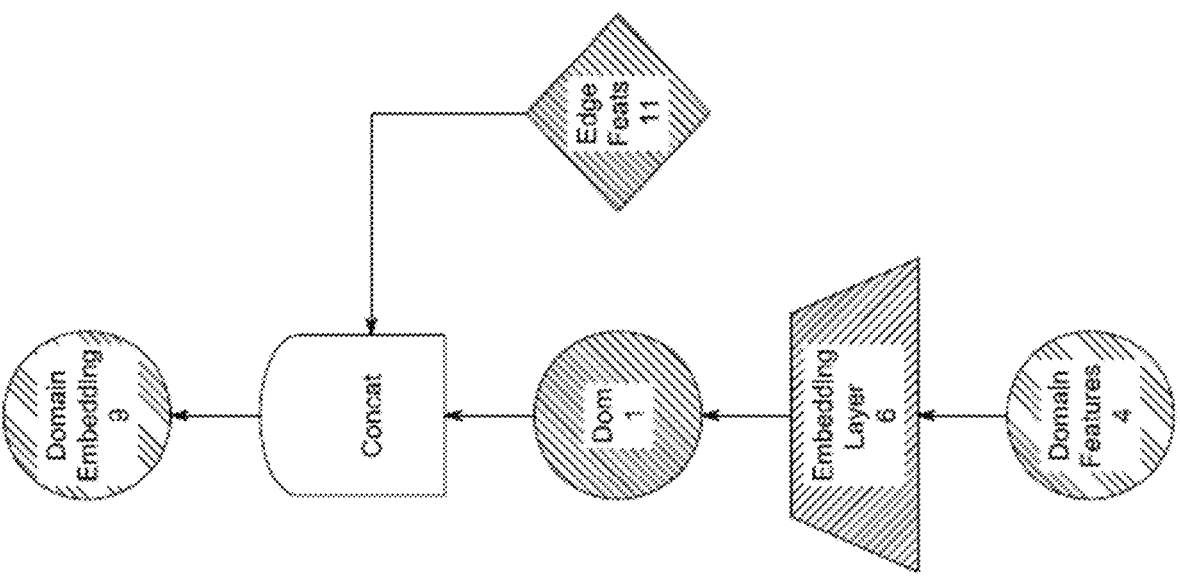
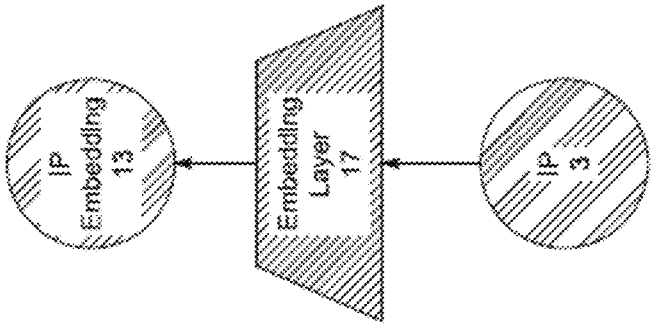
FIG. 2

FIG. 5

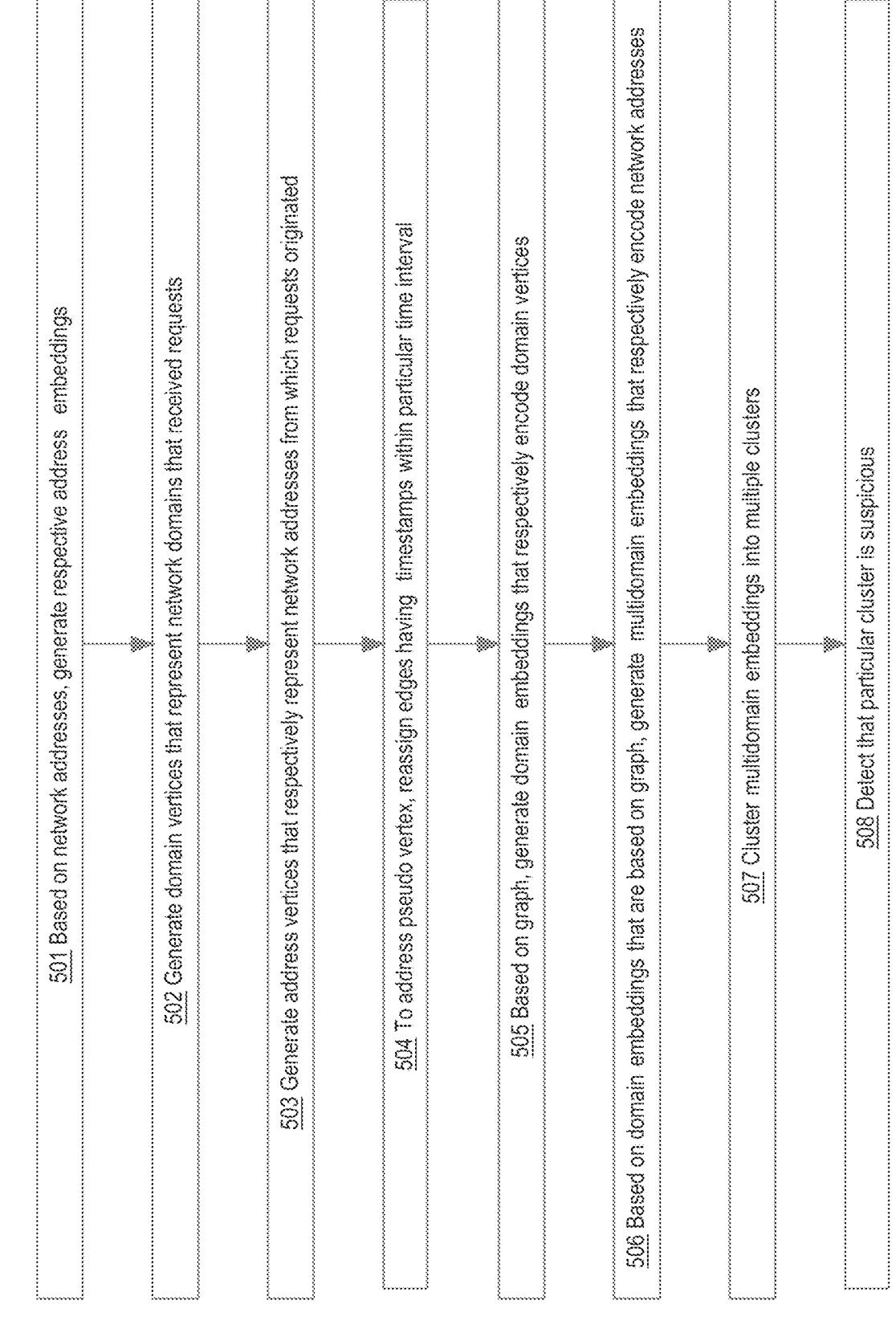

501 Based on network addresses, generate respective address embeddings

502 Generate domain vertices that represent network domains that received requests 503 Generate address vertices that respectively represent network addresses from which requests originated 504 To address pseudo vertex, reassign edges having timestamps within particular time interval 505 Based on graph, generate domain embeddings that respectively encode domain vertices 506 Based on domain embeddings that are based on graph, generate multidomain embeddings that respectively encode network addresses 507 Cluster multidomain embeddings into multiple clusters 508 Detect that particular cluster is suspicious

FIG. 6

601 Generate training graph that contains address vertices that represent network addresses in training corpus 602 Graph algorithm unsupervised trains feature weights 603 Randomly select address addresses 604 Randomly walk training graph 605 Based on training graph, generate training embeddings 606 Apply loss function that uses multiple multidomain embeddings 607 Calculate first inner product of two respective multidomain embeddings of current and reached network addresses 608 Calculate second inner product of two respective multidomain embeddings of current and random network addresses 609 Measure difference between first and second inner products 610 By backpropagation, adjust feature weights

FIG. 8

801 By unsupervised trained graph model, generate multidomain embeddings

802 Organize multidomain embeddings into multiple clusters

803 Based on clusters, unsupervised train all importances

804 Calculate respective centroid of each cluster

805 Measure respective entropy of importances for each multidomain embedding

806 Penalize sum of multiple importances for each multidomain embedding

807 Penalize mid-range importances

808 Calculate first inner product of each multidomain embedding and centroid of particular cluster that contains that multidomain embedding 809 Calculate average of respective inner products of respective centroid of each cluster that is not particular cluster and that multidomain embedding 810 Measure difference between first and average inner products for each multidomain embedding 811 Based on importances, generate explanation why particular cluster or particular multidomain embedding is or is not suspicious

INVALID TRAFFIC DETECTION USING EXPLAINABLE UNSUPERVISED GRAPH ML

BENEFIT CLAIM

This application claims the benefit as a divisional of application Ser. No. 17/558,342, filed Dec. 21, 2021, by Venzin et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE DISCLOSURE

The present invention relates to graph machine learning explainability (MLX) for invalid traffic detection. Herein are graph embedding, clustering, and unsupervised training techniques that explain why some related network traffic, such as from a botnet, is or is not suspicious.

BACKGROUND

The internet hosts many autonomous agents, including but not limited to crawlers, scrapers, indexers and malicious statistics-fraud botnets (i.e. federations of robotic network agents). When interacting with online resources, autonomous agents may be parasitic and do not bring any value to content providers. Ideally, valueless agents should be blocked from accessing resources or distorting access statistics. To enable this, an intelligent system for the detection of these agents is required. Regardless of which machine learning model is used for detection, if the machine learning model detects a certain network agent is possibly fraudulent, an investigation should first understand the reasons of this detection before interfering with the network agent. Mistakenly blocking benign agents that generate only valid traffic may be as risky as not blocking malign agents. As such, it may be important to have an explainable process to make informed decisions on blocking agents when appropriate.

Rule-based systems may provide limited explainability. Hand-crafted rules are commonly used to identify bots (i.e. parasitic robotic agents). Rules may depend on temporal characteristics of a bot's behavior and access patterns. Although rules may have high precision in simple scenarios, rule-based systems are typically not able to detect more sophisticated bots and depend on domain expertise of investigators who crafted the rules. Machine learning, such as a dense neural network or boosted decision trees, may classify agents as benign or fraudulent actors based on insights from the rule-based approach. A major deficiency of state of the art machine learning models is that they do not adequately capture the interactions between agents and resources and fail to leverage complex dependencies between multiple agents that may reveal malicious coordination.

BRIEF DESCRIPTION OF THE DRAWINGS

In the drawings:

FIG. 2 has two dataflow diagrams that operate independently of each other to provide respective data transformation to generate respective embeddings from raw data;

FIG. 5 is a flow diagram that shows an example graph embedding process that a computer may perform to facilitate detection and/or explanation of invalid network traffic such as from a botnet;

FIG. 6 is a flow diagram that shows an example unsupervised process that a computer may perform to train feature weights;

FIG. 8 is a flow diagram that shows an example unsupervised process that a computer may perform to train feature importances;

DETAILED DESCRIPTION

Figure 1:
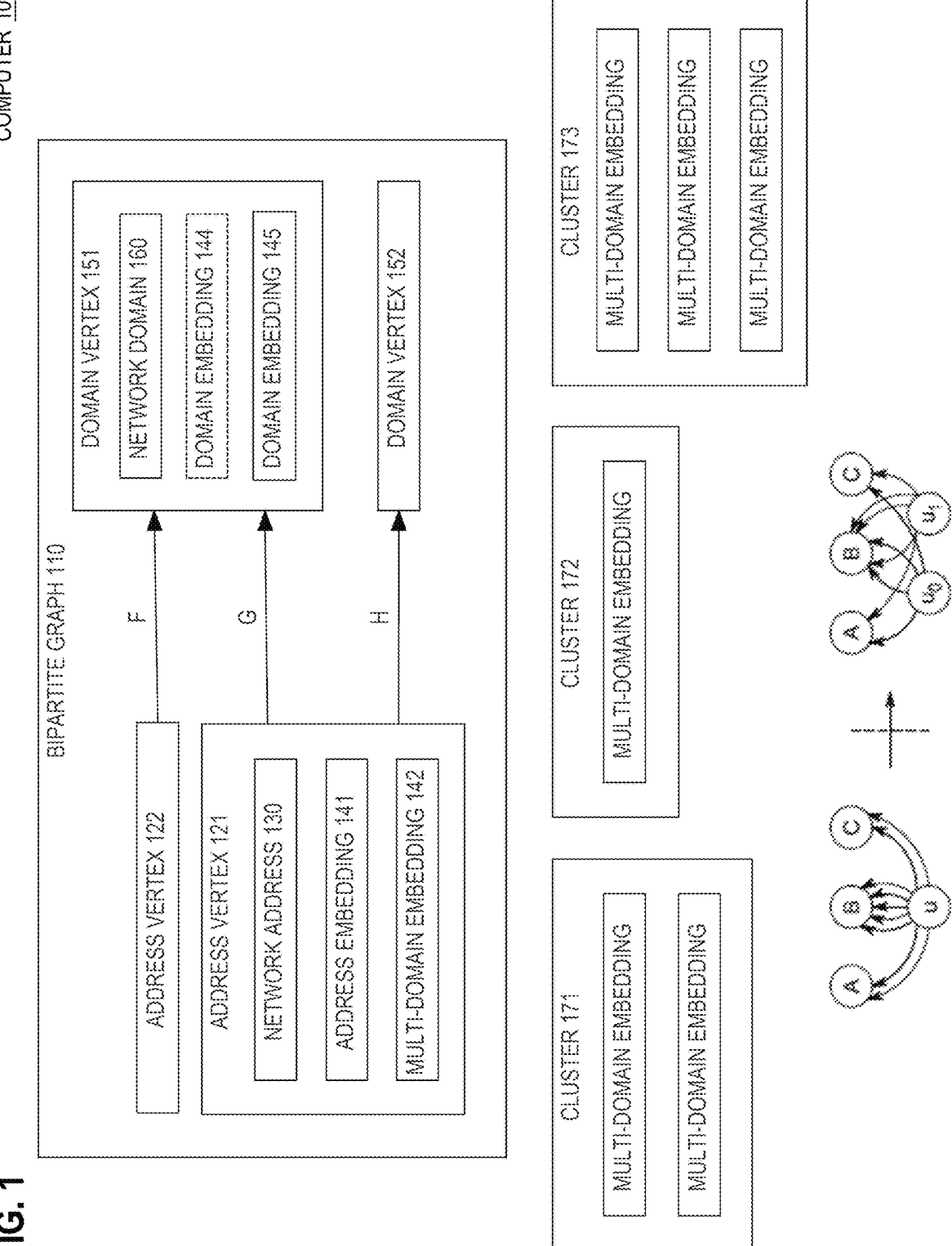
FIG. 1 is a block diagram that depicts an example computer that provides machine learning explainability (MLX) for invalid traffic detection by applying graph embedding, multidimensional clustering, and unsupervised training techniques that explain why some related network traffic, such as from a botnet, is or is not suspicious.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are graph machine learning approaches for invalid traffic (IVT) detection. Network traffic data herein is modeled as a bipartite heterogeneous graph where address vertices, representing users or agents, are connected via access edges to domain vertices which represent one or related online resource(s) and/or service(s) that the user interacted with. These approaches to detect IVT behavior are completely unsupervised and incorporate a novel explainability technique to support the output of a graph machine learning model which may be critical for cybersecurity applications.

These approaches leverage a graph model of network access data that facilitates extracting information between behaviorally similar agents and makes use of resource access patterns. Techniques herein exploit important temporal aspects of IVTs by directly including access timestamps as edge features.

As IVTs evolve quickly in the wild, requiring labelled training data is a decisive obstacle to state of the art IVT detection. Herein are improved unsupervised graph machine learning explainability and a first use of unsupervised graph machine learning in the context of IVT detection. Approaches herein provide a two-phase process that first computes representations, also referred to as embeddings, of every address vertex of a graph, and then clusters them to discover centroids of the clusters as anchor points in a contrastive loss function for unsupervised training.

These approaches detect a wider range of botnet (i.e. federation of parasitic network agents) variants that a rule-based system would not be capable of detecting. By representing the impression data as a graph model, approaches herein detect botnets based on collective behavior of many agents. The graph structure helps the model to consider factors such as co-visitation of network domains or temporal access patterns of agents.

Not requiring labelled data is a significant advantage over other approaches. Due to the distributed and covert nature of the problem, it is expensive and difficult to get high quality labelled data, i.e. traffic that was performed by real-world botnets. This is especially the case because botnet authors dynamically update their attack techniques to evade detection, thus quickly rendering previous labels outdated.

An explainability module of approaches herein assists investigators in understanding a model's output. Herein is an unsupervised explainer that facilitates a better understanding of why certain network addresses have been clustered together and whether or not those addresses represent a botnet performing IVT.

In an embodiment, an IVT detection pipeline is composed of the following three main components that operate in the following sequence.

1. Graph Creation: Convert the raw network traffic data into a graph format.
2. Model Training: Learn numerical representations for address vertices.
3. IVT Detection using Explainable Graph machine learning: Provide explainability for the model outputs and employ explanations in investigations.

Given a training graph, a goal is to learn feature weights as model parameters such that when applying the model on an unfamiliar graph, the model generates numerical vector representations, also called embeddings, that capture behavior and context of address vertices. Based on address features, features of network domains reachable from a network address, and the graph topology, an embedding characterizes the address and captures temporal access patterns of the address. Embeddings are used in a subsequent step to detect IVT based on different investigation approaches such as clustering-based or anomaly-based.

After feature weights have been learned, the trained model is applied to a new graph to detect recent (e.g. live) IVT. This inference step yields embeddings that incorporate information on address features, graph topology, and features from domains that have been accessed. Thus, an embedding herein is a dense distillation of rich features.

Techniques herein partition network addresses into multiple clusters and investigate each cluster individually for signs of IVT generation or other coordinated botnet behavior. Given one or multiple address vertices in the graph, the unsupervised explainer provides quantified relative importances for address features and for neighboring domain vertices. This information is used by investigators and domain experts to identify clusters as botnets or detect other types of IVT.

Techniques herein may achieve a desired accuracy or confidence of model parameters and/or explanations in less time than state of the art approaches. Thus as improvements over the state of the art, techniques herein accelerate, for achieving a desired accuracy or confidence, a traffic analysis computer.

In an embodiment, a computer generates a graph that contains: a) domain vertices that represent network domains that received requests and b) address vertices that respectively represent network addresses from which the requests originated. Based on the graph, domain embeddings are generated that respectively encode the domain vertices. Based on the domain embeddings, multidomain embeddings are generated that respectively encode the network addresses. The multidomain embeddings are organized into multiple clusters of multidomain embeddings. A particular cluster is detected as suspicious.

In an embodiment, an unsupervised trained graph model generates the multidomain embeddings. Based on the clusters of multidomain embeddings, feature importances are unsupervised trained. Based on the feature importances, an explanation is automatically generated for why an object is or is not suspicious. The explained object may be a cluster or other batch of network addresses or a single network address.

1.0 Example Computer

FIG. 1 is a block diagram that depicts an embodiment of an example computer 100 that provides machine learning explainability (MLX) for invalid traffic detection by applying graph embedding, multidimensional clustering, and unsupervised training techniques that explain why some related network traffic, such as from a botnet, is or is not suspicious. Computer 100 may be one or more of a rack server such as a blade, a personal computer, a mainframe, a virtual computer, a smartphone, or other computing device.

1.1 Network Element Data

Computer 100 may store or otherwise access many network addresses, such as network address 130, and many network domains such as network domain 160. For example, network address 130 may be a whole internet protocol (IP) address, such as based on IP version 4 or 6, or a media access control (MAC) address, such as for a network interface controller (NIC), or a partial network address such as a subnet such as composed of most significant bits or bytes of a network address. Network domain 160 may be a hostname of a physical or virtual computer such as host17.example.com, a (e.g. website) domain name of a cluster of computers such as portal.example.com, a domain name of an organization such as example.com, or a top level domain (TLD) such as .com. For example, network address 130 may be an integer or sequence of integers, such as octets, and network domain 160 may be text.

Various data fields may be directly associated with network address 130 such as a geographic locale, a polity such as a province or nation, a time zone, an internet service provider (ISP), a web browser fingerprint, a central processing unit (CPU) serial number, hypertext transfer protocol (HTTP) cookies, or authentication details such as a username, an account name, or an email address. Each data field associated with network address 130 may be encoded into address embedding 141 as one or more features. For example, each feature may be a multibyte number.

A non-numeric data field of any of embeddings 141-142 and 144-145 may be converted into one or more numeric features by dictionary encoding, hashing, one hot encoding, or direct storage of raw bytes (e.g. text characters) into bytes of numeric feature(s). Some or all numeric features may be normalized to a same value range such as 0.0 to 1.0 such as linearly or sigmoidal. Any of embeddings 141-142 and 144-145 may be operated as a feature vector such as for machine learning (ML).

1.2 Bipartite Graph

Computer 100 stores and operates bipartite graph 110 that contains two subgraphs. An address subgraph contains address vertices 121-122 that correspond to respective distinct network addresses. For example, address vertex 121 is for network address 130. Although not shown, address vertex 122 has its own data elements having same respective kinds as data elements 130 and 141-142 in address vertex 121.

A domain subgraph contains domain vertices 151-152 that correspond to respective distinct network domains. For example, domain vertex 151 is for network domain 160. Although not shown, domain vertex 152 has its own data elements having same respective kinds as data elements 160 and 145 in domain vertex 151.

1.3 Edges

Bipartite graph 110 contains edges F-H, each of which represents a previously recorded interaction between a respective network address and a respective network domain. An edge connects an address vertex to a domain vertex. Thus, an edge connects the address subgraph to the domain subgraph. Edges F-G demonstrate that multiple network addresses may interact with a same network domain. Edges G-H demonstrate that a same network address may interact with multiple network domains.

An edge may represent that, to a network domain, a network address sent a request such as an HTTP request, a message such as a protocol unit or application message, or a unit of transmission such as a network packet, a datagram, a frame, or a ping. An edge is shown as directed to depict that a network address, not a network domain, initiated the interaction. However, the edge may be implemented as undirected or bidirectional (e.g. the network domain may responsively send a transmission back to the initiating network address). In any case, techniques herein treat edges as undirected.

An edge, its initiating network address, and its target network domain may be loaded from a data source such as a network traffic log of a router, firewall, or load balancer, a console log of a server, or a database or other archive. For example, computer 100 may ingest log(s) to generate bipartite graph 110, vertices 121-122 and 151-152, and edges F-H. Computer 100 further processes bipartite graph 110 as follows.

1.4 Kinds of Embeddings

Although address embedding 141 is initially based on network address 130 but not bipartite graph 110, embeddings 142 and 144-145 are initially based on bipartite graph 110 as follows. Domain embeddings 144-145 contains edge features and domain features. Domain features may include a geographic locale, a polity such as a province or nation, a time zone, an ISP, a domain name registrar, a whole or partial domain name, a traffic volume magnitude or relative ranking, attributes of a datacenter or public or private cloud, and/or other data directly associated with a network domain. An embodiment need not have domain features. For example, domain embeddings 144-145 may contain only edge features.

Edge features may include a uniform resource locator (URL) (or any URL component such as a transport protocol, a port number, a filename, or a query string or query parameter), a timestamp, a transmission size, and/or a context detail. Context details may include environmental details that are directly related to the edge. For example the edge may represent an impression communication in support of the lifecycle of a web browser banner impression, in which case context details may include banner size or video duration, banner identifier, banner advertiser, banner placement auctioneer, and/or banner interactions such as hover, click, video pause or unmute, or scroll into or out of view. Impression communication may be initiated by dynamic hypertext markup language (DHTML) such as with asynchronous Javascript and XML (AJAX). In an embodiment, edges have no features except a timestamp.

There is a domain embedding for each edge. For example, domain embedding 144 is based on features of edge F, and domain embedding 145 is based on features of edge G. Thus, domain vertex 151 may have multiple domain embeddings 144-145. Domain vertices that have different respective counts of edges may have different amounts of domain embeddings. For example, domain vertex 151 has more domain embeddings than does domain vertex 152 that has only one edge. Which of domain embeddings 144-145 is used and/or calculated may depend on which of address vertices 121-122 is being embedded. For example, domain embedding 144 is drawn with a dashed outline to indicate that domain embedding 144 is not used and/or not calculated because network address 130 may be an only relevant network address for some scenarios discussed herein. For example, each domain vertex may have multiple edges but only one domain embedding in some scenarios herein where only edges connected to a same address vertex are relevant.

In an embodiment, edges are aggregated as follows during construction of bipartite graph 110 based on aggregation arithmetic such as a statistic of values of a feature of edges such as a count, sum, mean, median, mode, variance, or maximum. For example, some or all edges between a same address vertex and a same domain vertex may be combined into a single edge whose feature values are aggregated values. Likewise: a) edges between a same address vertex and a same domain vertex may be organized by edge timestamp into histogram bins of adjacent time intervals, and b) edges in a same bin may be combined into a single edge. Thus, an edge may or may not represent multiple network interactions.

Multidomain embedding 142 contains address embedding 141 and an aggregation of the domain embeddings of the domain vertices of all of the edges connected to address vertex 121. Thus, domain aggregation only aggregates domains that are immediate neighbors of an address vertex. For example, multidomain embedding 142 contains an aggregation of the domain embeddings of domain vertices 151-152. Domain aggregation may use any of the aggregation mechanisms discussed above for edge aggregation.

1.5 Trainable Weights

As discussed above, feature encoding into an embedding of any kind may entail normalization such as sigmoidal scaling. In an embodiment, each feature has its own respective numeric weight to provide further scaling such as by arithmetic multiplication such as before or after normalization. In an embodiment, feature weights are trainable such as according to ML training techniques such as backpropagation.

In an embodiment, training the feature weights is unsupervised such as according to a GraphSAGE algorithm for training graph embeddings. GraphSAGE effectively expands a respective radius around each vertex by one hop per iteration up to a configurable maximum count of iterations. Embeddings of either or both kinds of vertices within the radius may be express or (e.g. based on a previous iteration) implied factors in a loss formula for (e.g. gradient based) backpropagation. Novel loss formulae for unsupervised weight training are presented later herein. Graph-SAGE herein is enhanced beyond the state of the art to process vertices of different kinds and to process edge features.

Trained weights for encoding values into embeddings should cause embeddings of a same kind to be quantifiably and recognizably similar or dissimilar according to the similarity/dissimilarity of comparable vertices (i.e. vertices of a same kind). Such detectable similarity should include context (i.e. local graph topology) as provided by aggregation mechanisms and GraphSAGE as discussed above. In other words, whether two vertices are similar depends on their vertex features, edge features, and features of neighboring vertices.

1.6 Invalid Traffic

The purpose of weight training (e.g. GraphSAGE) is to ensure that embeddings reflect the presence or absence of such similarity. Because edges represent behavior (i.e. interactions) and similarity is partly based on edges, thus vertex similarity is partly based on behavior, which may or may not be suspicious, either for an individual network address or for a collection of network addresses such as a botnet. However, similarity needs further analysis herein for detecting invalid traffic such as from a botnet comprising many computers that are federated for an improper purpose.

In one example, a botnet implements a distributed denial of service (DDOS) attack. In another example, a botnet fraudulently inflates demand statistics. In another example, a botnet diffusely implements a spam email campaign. In another example, a botnet steals computer resources such as for cryptocurrency mining.

In any case, detecting and neutralizing a botnet according to techniques herein may preserve computer resources such as network or processor bandwidth, electricity, or data integrity or privacy. For example a computer or computer cloud will have increased resources and run faster due to botnet detection techniques herein than a similar computer or cloud without such detection. Thus, techniques herein accelerate the computer itself by avoiding resource parasitism and increased load typical of a botnet.

Herein, further analysis is based on multidimensional clustering of multidomain embeddings of respective network addresses. For example, all multidomain embeddings may be organized into a fixed or calculated count of clusters such as clusters 171-173 containing same or different counts of multidomain embeddings. A cluster may or may not be suspicious and may or may not represent a botnet, which are various classifications that may be inferred.

1.7 Machine Learning Explanability (MLX)

For example, computer 100 may automatically identify one cluster as potentially being a botnet as a preliminary (e.g. unreliable) classification. Reliable final classification may entail painstaking human expertise to review and analyze a preliminary automatic classification. Computer 100 facilitates such review by generating an explanation of any of: a) a preliminary classification of a cluster, b)

generation of a particular cluster, or c) inclusion of a multidomain embedding of a particular network address in a cluster.

As explained later herein, the explanation may indicate which features in which kind of embeddings were most influential for clustering or preliminary classification. Such feature importances may be used to guide further manual analysis and to justify manual decisions such as temporarily or permanently throttling (i.e. capacity limiting) or blacklisting some or all network addresses of a cluster such as in a firewall configuration or other network security infrastructure. Although feature importances and feature weights are both numeric, they are not semantically interchangeable and, thus, are differently trained as explained later herein. In an embodiment, the explanation of multidomain embedding 142 indicates which features of network address 130 and/or which neighbor vertices of address vertex 121 were most influential.

1.8 Temporal Analysis

Invalid traffic may be temporally correlated and/or detected based on live data such as in real time. For example a DDOS attack entails a burst of concurrent requests, such as when many edges have similar or identical timestamps. Whereas a spam email botnet may instead relay email with as little throughput and throughput volatility as possible. Thus, the temporal distribution of edges may be significant for classifying a cluster as suspicious or unsuspicious and/or distinguishing which kind of botnet is a cluster.

To facilitate temporal analysis, some or all address vertices may be cloned as shown by the graph transformation at the bottom of FIG. 1. On the left is an original bipartite graph that contains domain vertices A-C and original address vertex U. By transformation, a regularized bipartite graph on the right is generated from the original bipartite graph as follows.

All of the edges of the original bipartite graph may be sorted, by edge timestamp, into temporal histogram bins that each represent an adjacent time interval such as seconds, minutes, hours, days, weeks, or months. For example, a day's worth of edges may be divided into daytime edges and night edges. Original address vertex U may be split into multiple address pseudo-vertices U-U1 that are clones of original address vertex U and collectively replace original address vertex U.

For example, address pseudo-vertex U1 may be the nighttime representation of original address vertex U. Edges of original address vertex U are reassigned to address pseudo-vertices U0-U1 based on edge timestamp. For example as shown, original address vertex U sent two requests (i.e. edges) to domain vertex A.

Because one of those requests occurred at noon and the other at night, both edges are separately reassigned to respective address pseudo-vertex U0 or U1 as shown. This regularization transformation may be a preface to graph embedding techniques herein such that embeddings generation and weight training are based only on the transformed graph on the right. Because domain embeddings and multidomain embeddings depend on local graph topology (i.e. edge connectivity), address vertices U, U0, and U1 may have same or different multidomain embeddings, which may or may not effect clustering.

For example, the multidomain embeddings respectively for address pseudo-vertices U0-U1 may both be placed in same cluster 173 or in separate clusters even though address pseudo-vertices U0-U1 represent same original address vertex U. Thus, regularization for temporal patterns may effect: a) how many clusters are generated, b) how many multidomain embeddings does a particular cluster contain, and c) how many clusters may contain multidomain embeddings for address pseudo-vertices that represent a same particular original address vertex.

An edge timestamp may be encoded as a feature in various ways. For example, each natural or binning time interval may be represented as a separate numeric feature, and a timestamp may be one hot encoded according to falling into one of multiple time intervals. For example, all edges of a same address pseudo-vertex may have a same one hot encoding of slightly different respective timestamps. There may be multiple one hot encodings for different natural time granularities. For example, there may be a first one hot encoding for hour of day and a second one hot encoding for day of week.

1.9 Hardware Acceleration

For efficiency and/or capacity, edges may be subsampled and/or partitioned such that: a) only one portion of bipartite graph 110 is processed at a time, b) bipartite graph 110 is not processed as a whole, and/or c) some portions of bipartite graph 110 might never be processed. For example, an address vertex or domain vertex need not be processed if none of the vertex's edges are processed. Processing less than a whole graph may: a) provide acceleration to facilitate real time processing of live/streaming data and/or b) decrease the working set of data to fit within limited memory of a network switch/router or graphical processing unit (GPU).

A GPU may provide acceleration for numeric intensive processing such as weight training and/or, as explained later herein, importance training. Subsampling may be random. Partitioning may operate in a same way (e.g. same or different granularity) as binning based on edge timestamp. For example, a GPU may receive and process one partition at a time. Partitioning may or may not be combined with subsampling that is performed by a central processing unit (CPU) before transferring a subsampled partition to the GPU.

2.0 Example Embedding Layers

FIG. 2 depicts two dataflow diagrams that operate independently of each other to generate respective embeddings 9 and 13. Shown embedding layers 6 and 17 provide data transformation to generate an embedding from raw data as follows. FIG. 2 is discussed with reference to FIG. 1.

The left dataflow diagram shows embedding layer 17 that accepts IP 3 as raw input and generates IP embedding 13 as output. The purpose of embedding layers of various kinds herein is to encode raw features into feature vectors as explained earlier herein. An embedding layer may contain and apply trained feature weights as explained earlier herein. In that way, embedding layers 6, 8 (shown later), and 17 effectively are trainable models according to weight training techniques herein.

Embedding layer 17 is reused (i.e. reapplied) to each network address. For example, IP 3 may be network address 130 and IP embedding 13 may be address embedding 141.

The right dataflow diagram shows embedding layer 6 that accepts domain features 4 as raw input and generates: a) dom 1 as an intermediate result and, after aggregation, domain embedding 9 as output. For example, domain features 4 may be network domain 160 and domain embedding

9 may be domain embedding 145. As explained earlier herein, domain embedding 9 contains encoded domain features, shown as dom 1, and encoded features of multiple edges, shown as edge feats 11.

Dom 1 and edge feats 11 are separate sets of encoded features that are concatenated by width to generate domain embedding 9. Thus, the width of domain embedding 9 is the sum of the widths of dom 1 and edge feats 11. Embedding layer 6 is reapplied to each network domain, which entails embedding all of the edges connected to that network domain.

3.0 Multidomain Embedding Layer

Figure 3:
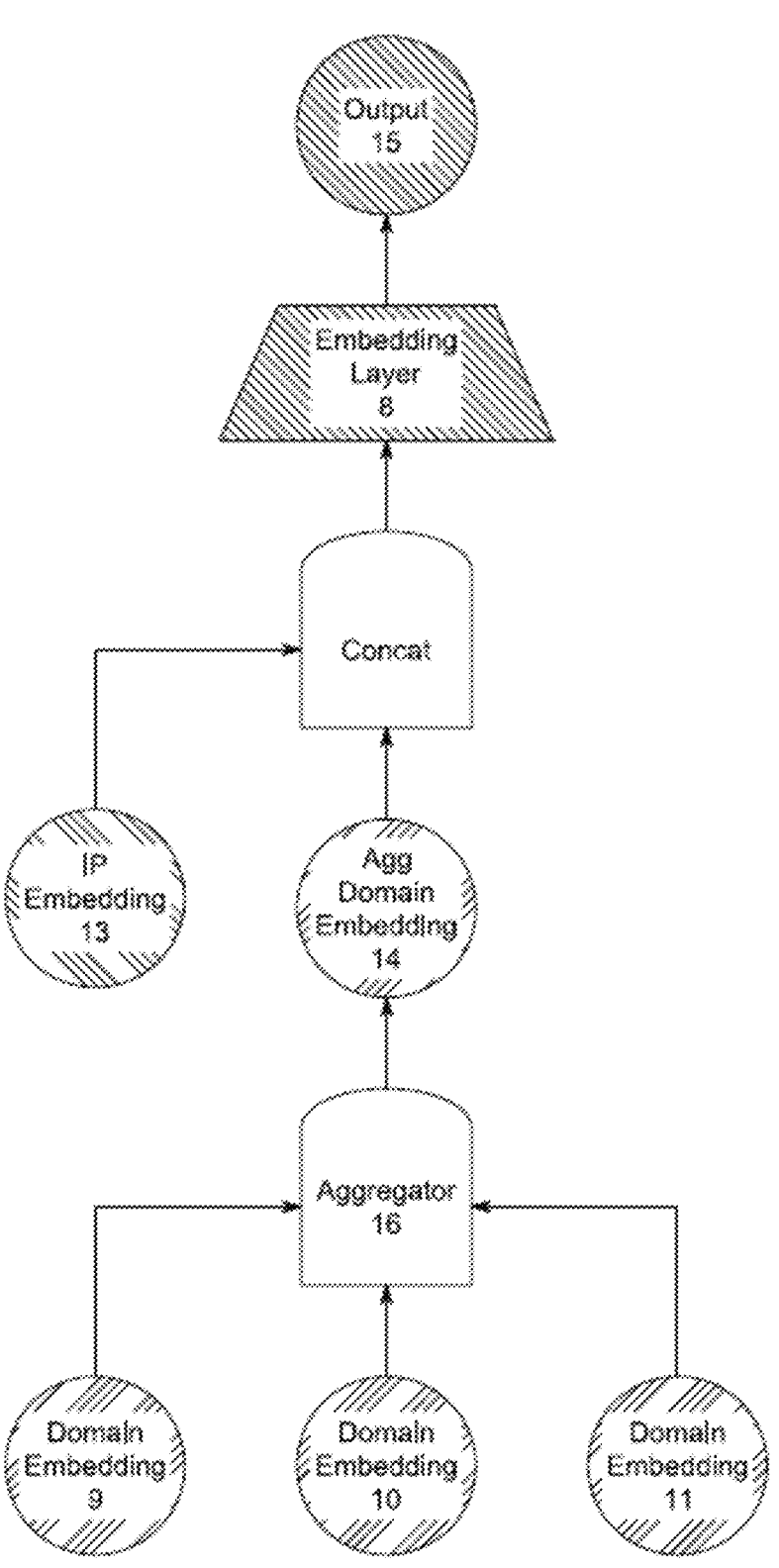
FIG. 3 is a dataflow diagram that shows an embedding layer that accepts already generated embeddings of various kinds as input and generates a multidomain embedding as output.

FIG. 3 depicts a dataflow diagram that shows embedding layer 8 that accepts already generated embeddings 9-11 and 13 as input and generates output 15. FIG. 3 is discussed with reference to FIGS. 1-2.

IP embedding 13 may be address embedding 141; domain embedding 9 may be domain embedding 145; and output 15 may be multidomain embedding 142. As explained earlier herein, output 15 contains a concatenation by width of: a) IP embedding 13 and b) an aggregation of the domain embeddings of domain vertices 151-152 connected to edges G-H that are connected to address vertex 121. For example as shown, aggregator 16 may generate agg domain embedding 14 by aggregating domain embeddings 9-11 that may represent domain vertices that are direct neighbors of an address vertex represented by IP embedding 13. Embedding layer 8 is reapplied to each address embedding, which entails aggregating all of the domain embeddings that represent domain vertices that are direct neighbors of the address vertex that corresponds to the address embedding.

4.0 Timeseries and Tuples

Figure 4:
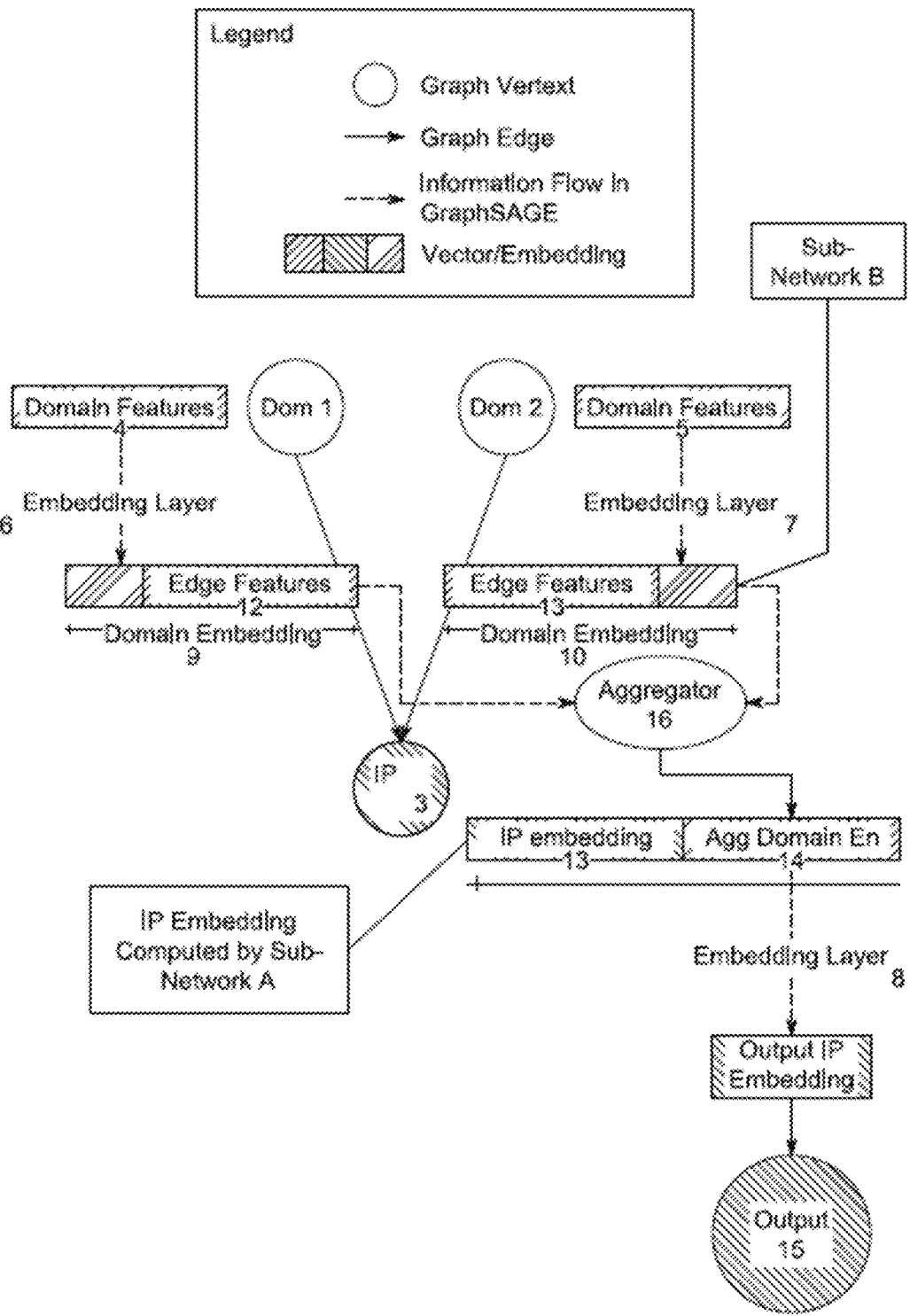
FIG. 4 is a dataflow diagram that shows example embeddings for one network address and two network domains.

FIG. 4 depicts a dataflow diagram that shows example embeddings for one network address and two network domains. FIG. 4 is discussed with reference to FIGS. 1-3.

Doms 1-2 are domain vertices whose respective network domains have respective domain features 4-5. Doms 1-2 are connected to by edges to IP 3 that is an address vertex. The shown direction of the edges is irrelevant because these edges are treated as undirected.

Domain features 4-5 and aggregated edge features 12-13 are embedded by an embedding layer, shown as embedding layers 6-7 that actually are one and the same embedding layer 6 shown in FIG. 2. This embedding layer generates domain embeddings 9-10. The dataflow diagram on the right side of FIG. 2 is labeled in FIG. 4 as subnetwork B.

The dataflow diagram on the left side of FIG. 2 is labeled in FIG. 4 as subnetwork A that embeds the network address of address vertex IP 3 into IP embedding 13 that is an address embedding. Aggregator 16 aggregates domain embeddings 9-10 into agg domain en 14 that is concatenated with IP embedding 13 by embedding layer 8 (also shown in FIG. 3) to generate shown "output IP embedding" that is also shown as output 15 that is a multidomain embedding.

5.0 Graph Embedding Process

FIG. 5 is a flow diagram that depicts an example graph embedding process that computer 100 may perform to facilitate detection and/or explanation of invalid network traffic such as from a botnet. FIG. 5 is discussed with reference to FIGS. 1-4.

The process of FIG. 5 may occur in three phases. A first phase includes step 501 that does not entail graph generation or graph processing. A second phase includes steps 502-506 that generate and process bipartite graph 110 to generate embeddings. A third phase includes steps 507-508 that perform analytics based on the embeddings.

Embedding steps 501 and 505-506 presume that feature weights were previously trained such as by GraphSAGE such as with a training bipartite graph that, as discussed later herein, is or is not bipartite graph 110. Based on network addresses, step 501 generates respective address embeddings as explained earlier herein. For example, step 501 may implement the dataflow diagram on the left side of FIG. 2.

Steps 502-504 generate bipartite graph 110. Step 502 generates domain vertices that represent network domains. Step 502 may process all available network domains or only network domains that received requests from the network addresses.

Step 503 generates address vertices that respectively represent network addresses. Step 503 may process all available network addresses or only network addresses that sent requests to the network domains. Step 503 may generate one address vertex per network address or may generate one or more address pseudo vertices per network address for regularization as discussed earlier herein.

Step 504 is implemented only if step 503 generated address pseudo vertices for regularization. To each address pseudo vertex, step 504 assigns edges having timestamps within the particular time interval of the address pseudo vertex as explained earlier herein.

Steps 505-506 perform graph analytics. Based on bipartite graph 110, step 505 generates domain embeddings that respectively encode domain vertices as discussed earlier herein. For example, step 505 may implement the dataflow diagram on the right side of FIG. 2.

Based on domain embeddings that are based on bipartite graph 110, step 506 generates multidomain embeddings that respectively encode network addresses as discussed earlier herein. For example, step 506 may implement the dataflow diagram of FIG. 3.

Steps 507-508 do not entail graph analytics and may or may not discard some or most of the details of bipartite graph 110. For example, step 507 may operate only with multidomain embeddings, and step 508 may operate only with multidomain embeddings and network addresses. In an embodiment, a multidomain embedding contains one network address. For example, multidomain embedding 142 may contain or otherwise be associated with network address 130.

Step 507 organizes multidomain embeddings into multiple clusters. A count of clusters may depend on: a) a clustering algorithm, b) a predefined fixed count, and/or c) a count and/or content of the multidomain embeddings. Clustering may use any or all of the features of the multidomain embeddings. Clustering may or may not entail calculation of a multidimensional centroid of a cluster. After clustering, a centroid may have other purpose(s) as discussed later herein.

An embodiment may or may not implement step 508 that may be automatic and/or manual. For example, step 508 may or may not be a prerequisite of ML explainability (MLX) techniques presented later herein. Step 508 detects that a particular cluster is suspicious. For example, an anomaly detector may automatically detect that the particular cluster is suspicious, which may be preliminary, and manual analysis may subsequently confirm that the particular cluster is or is not a botnet.

6.0 Weight Training Process

FIG. 6 is a flow diagram that depicts an example unsupervised process that computer 100 may perform to train feature weights. FIG. 6 is discussed with reference to FIGS. 1-5.

As explained earlier herein, production process of FIG. 5 presumes that feature weights are already trained. In other words, the training process of FIG. 6 precedes the production process of FIG. 5. For example, the processes of FIGS. 5-6 may occur on a same or separate computers in a same or separate environments such as a production datacenter and a laboratory respectively.

Step 601 generates a bipartite training graph that contains address vertices that represent network addresses in a training corpus. For example, the training graph and bipartite graph 110 may be a same graph, partially overlapping graphs that share some vertices and edges, or disjoint graphs that share no vertices nor edges. Either of the training graph and bipartite graph 110 may be the larger of the two graphs. Training graph construction by step 601 may entail same graph construction logic as for bipartite graph 110 according to graph generation techniques presented earlier herein.

In step 602, a graph algorithm unsupervised trains the feature weights needed to generate the three kinds of embeddings that are discussed earlier herein. For example, the graph algorithm may be an enhanced GraphSAGE that is complicated and entails steps 603-610 as substeps.

GraphSAGE may concurrently and/or iteratively process vertices during training. Training is demonstratively discussed as iterative such that each iteration has one current address vertex. Concurrent processing may entail multiple current address vertices. Each iteration repeats steps 603-609.

Step 603 randomly selects: a) a random network address and/or b) the current network address. A network address may be directly (e.g. randomly or not) selected or indirectly selected by selecting an address vertex, an edge, or an address embedding. In an embodiment, an address embedding contains or otherwise is associated with a network address. For example, address embedding 141 may or may not contain network address 130. In any case, step 603 selects both the random address vertex and the current address vertex, even if only one of those is randomly selected.

Starting at the current address vertex, step 604 randomly walks the training graph to eventually reach a reached address vertex. Step 604 treats edges as undirected. Step 604 traverses an even count of edges that is at most, at least, and/or exactly a predefined count of edges. Thus in various embodiments, different walks must or need not have a same fixed length. An even count ensures that the random walk always begins and ends at address vertices, although domain vertex(es) are visited during the walk.

Walking entails starting at the current address vertex as a visited vertex and then repeatedly traversing to a neighboring vertex. Each hop entails randomly selecting an edge of the visited vertex for hopping to a neighboring vertex. Depending on the embodiment, a same walk: a) can or cannot traverse a same edge twice, b) can or cannot visit a same vertex twice, c) can or cannot visit the starting address vertex twice, and/or d) can or cannot finish at the starting address vertex. Separate walks are independent and may partially overlap. In any case, a result of cooperating steps 603-604 is selection of three address vertices: random, current, and reached (by walking).

Based on the training graph, step 605 generates a multidomain embedding of the current vertex. Step 605 does not depend on any previously generated multidomain embedding of the current address vertex, which may be overwritten or discarded by step 605. Step 605 uses the current values of feature weights, which may fluctuate during training. Thus if or when the current address vertex is again selected as the current address vertex in a later iteration, repetition of step 605 may generate a different multidomain embedding of the same current address vertex. Feature weights may be initialized to 1.0 or 0.5 or randomly and then fluctuate as discussed below.

The timing/frequency of step 605 is demonstrative. In various embodiments, one, some, or all multidomain embeddings are instead recalculated before or after each iteration. In any case during iteration, a multidomain embedding of any address vertex is always available, can be generated if missing, and/or is revisable if feature weights were revised. Address embeddings and domain embeddings may or may not have a same availability/refreshing as multidomain embeddings. There may be cascaded revisions such that a change to an address feature weight may cause all three kinds of embeddings to need refreshing.

Step 606 applies a loss function that uses multidomain embeddings of the current address vertex, the random address vertex, and the reached address vertex. Thus, step 606 uses multiple multidomain embeddings. Step 606 may have steps 607-609 as substeps performed by the loss function.

Step 607 calculates a first inner product of two respective multidomain embeddings of the current address vertex and the reached (i.e. walked to) address vertex. Each of both network addresses communicated with overlapping respective sets of network domains. The more overlap, the more similar are the access patterns of both network addresses, which: a) causes topological collocation of both address vertices within the training graph and b) increases the likelihood that both network addresses occur in a same walk.

Such similar vertices should have similar embeddings, and that similarity is measured by step 607. Herein, an inner product is also referred to as a scalar product or a dot product and the result is a scalar measurement of similarity with zero meaning no similarity and a higher value meaning more similarity than a lower value.

Step 608 calculates a second inner product of two respective multidomain embeddings of the current address vertex and the random address vertex. Random selection means that these two address vertices are unlikely to be collocated in the training graph, which means that their multidomain embeddings should be dissimilar.

Step 609 measures loss by measuring a difference between both inner products. For example, the difference may be related to the subtractive scalar difference of the first inner product minus the second inner product. In an embodiment, step 609 uses the following weight training loss formula.

$$\text{Loss}(v) = -\log(s(emb(v) \times emb(u))) - Q^* \log(s(-emb(v) \times emb(w)))$$

For example, GraphSAGE as enhanced herein may use the above weight training loss formula. The following terms have the following meaning in the above weight training loss formula.

v: the current address vertex
u: the reached (i.e. walked to) address vertex
w: the random address vertex
s( ) a sigmoid function emb( ) a multidomain embedding of any address vertex based on current feature weight values that fluctuate
Q: a configurable hyperparameter as a numeric multiplier
x: a scalar inner product of any two multidomain embeddings By (e.g. gradient based) backpropagation and according to the above weight training loss formula, step 610 adjusts feature weights. Although loss is measured only for multidomain embeddings of address vertices, backpropagation based on these losses may be used to adjust feature weights of: a) multidomain embeddings of address vertices, b) domain embeddings of domain vertices, and/or c) address embeddings of address vertices. Thus, all feature weights may be adjusted by such backpropagation. Thus, all embeddings of all three kinds may need recalculating after backpropagation. After weight training finishes, feature weights are not adjusted. All feature weights may be repeatedly reused as-is with other bipartite graphs without retraining.

7.0 Multidimensional Clustering

Figure 7:
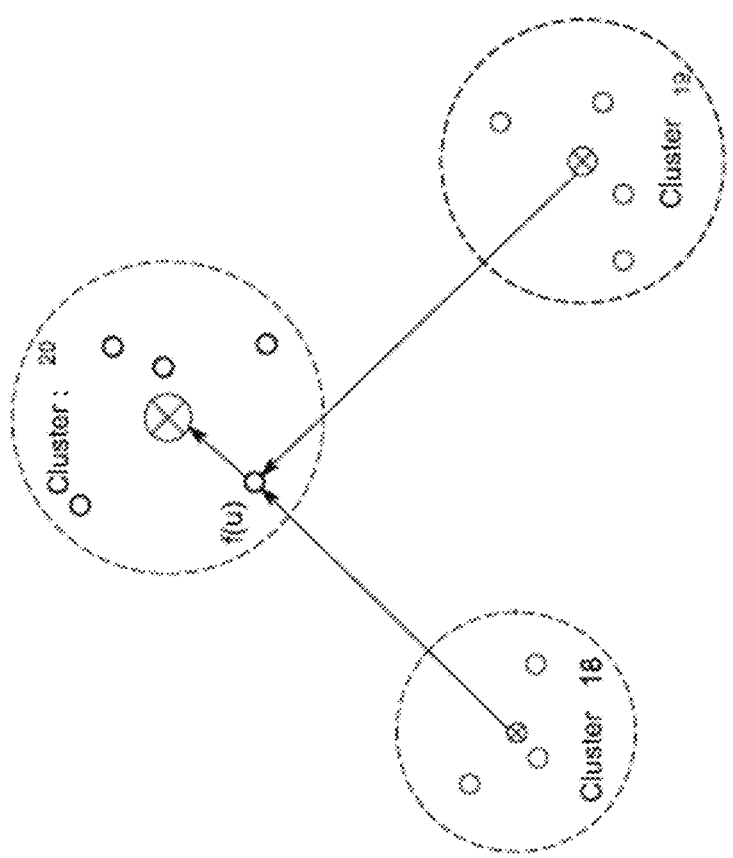
FIG. 7 is a block diagram that depicts an example multidimensional clustering of multidomain embeddings for respective network addresses.

FIG. 7 is a block diagram that depicts an example multidimensional clustering of multidomain embeddings for respective network addresses. For example, computer 100 may generate, store, and analyze clusters 18-20 that may be clusters 171-173 of FIG. 1. One or none of the clusters may be suspicious such as a botnet.

During or after clustering, computer 100 may calculate a respective multidimensional centroid (shown as an encircled X) of each of clusters 18-20 that are shown as dashed circles. A centroid may be calculated by measuring a respective average value for each feature across all multidomain embeddings in the cluster. For example, if each multidomain embedding has a temperature feature and an age feature, then each centroid has a respective average temperature and a respective average age of its respective cluster, which need not match the temperature and/or age of any multidomain embedding. However because embeddings are transformative, such as by sigmoid and weight, an embedded temperature and age of a vertex are not empirical and recognizable values of a temperature and age, neither of which would naturally be a number between zero and one. Thus too, the average values in the centroid are not necessarily recognizable as a temperature value and an age value.

Thus, a centroid is a virtual embedding and not an actual embedding. Centroids may be used to: a) unsupervised train feature importances as explained later herein and/or b) quickly assign a new network address to an existing cluster based on which cluster's centroid is, by multidimensional Euclidian distance, closest to the multidomain embedding of the new network address. For example if cluster 20 was already classified as a botnet, then a multidomain embedding of a new network address may in real time be assigned to an existing cluster that, if botnet cluster 20, then the new network address may be classified in real time as being part of the botnet. FIG. 7 shows additional details that are discussed later herein.

8.0 Importance Training Process

FIG. 8 is a flow diagram that depicts an example unsupervised process that computer 100 may perform to train feature importances. FIG. 8 is discussed with reference to FIGS. 1 and 7.

Feature importance is semantically different from feature weight because: a) they are trained by different respective algorithms, b) there are three kinds of embeddings and thus three distinct sets of weights but there are only two kinds of importances, and c) weights and importances are used for different respective purposes. For example, feature weights are used to generate embeddings, whereas feature importances are used to explain clustering.

Despite these semantic differences, feature importances and feature weights may have somewhat similar mechanisms as follows. For example, feature importances may have a same value range and normalization as feature weights. As explained earlier herein, a multidomain embedding is a concatenation of: a) an address feature vector (i.e. address embedding) and b) an aggregate of several domain embeddings.

Whereas, importances are a concatenation of: a) address feature importances and b) domain importances that correspond to respective domains instead of domain features. The domain importances correspond to respective domain vertices that are direct neighbors of the address vertex. Because two address vertices may have different counts of neighboring domain vertices, the respective importances of the two address vertices may have different respective counts of domain importances.

Thus, the two address vertices may have different respective counts of importances such that their respective sets of importances effectively are feature vectors of different widths. Thus, unlike weights for a multidomain embedding layer that all address vertices may share, each address vertex has its own respective distinct set of trainable values of importances. For example, importances of a first address vertex as a feature vector may be narrower than a multidomain embedding, and importances of a second address vertex as a feature vector may instead be wider than the multidomain embedding.

The process of FIG. 8 presumes that all feature weights were already trained. For example, all feature weights may constitute an already trained graph model. In step 801 for any bipartite graph described herein, an unsupervised trained graph model generates all multidomain embeddings (and all of both other kinds of embeddings) based on the multidomain feature weights. For example, step 801 and step 506 of FIG. 5 may be a same or somewhat similar step.

Step 802 organizes the multidomain embeddings into multiple clusters. For example, step 802 and step 507 of FIG. 5 may be a same or somewhat similar step. Herein: a) each address vertex has b) one distinct multidomain embedding and c) one distinct set of feature importances. Thus, there is a one-to-one-to-one three-way relationship between (a), (b), and (c), which may be demonstratively discussed as somewhat interchangeable at least because (a), (b), and (c), as a triple, may be supported by a three-way map such that any one of (a), (b), and (c) may be used as a key to lookup a whole triple or any other part of the triple.

Based on the clusters, step 803 unsupervised trains all feature importances. In an embodiment, training the feature importances is based on a GNNExplainer algorithm for providing an ML explanation (MLX) of clustering of vertices. As explained earlier herein, feature importances and feature weights are not semantically interchangeable, although they may share some mechanisms such as normalization and/or (e.g. gradient based) backpropagation. Without regard for clustering, feature weights are trained to indicate vertex contextual similarity. There are many different clustering algorithms available, and they need not agree on a count of clusters, a size of a cluster, nor an assignment of a multidomain embedding to a cluster.

For example, a clustering algorithm may have a count of clusters as a hyperparameter. When the hyperparameter is adjusted, clustering changes and, thus, an explanation of clustering might need to change. Thus unlike feature weights that necessarily are trained before clustering, feature importances should instead be trained after clustering.

GNNExplainer learns how much respective impact each feature has on a particular clustering, which entails training the feature importances that measure the respective impacts. Training step 803 may entail some or all of steps 804-810 as training substeps that may entail novel loss formulae for unsupervised importance training. GNNExplainer herein is enhanced beyond the state of the art to reward sparsity and forgo mutual information that is an expensive way to measure entropy. In an embodiment, mutual information is used to measure loss.

Step 804 calculates a respective centroid of each cluster of multidomain embeddings that may logically be treated as a virtual domain embedding of a non-existent address vertex as explained earlier herein. Although loss measurement may be based on centroids, centroids should be cached and not recalculated for each loss measurement.

Loss measurement steps 805-810 may be repeated for each address vertex. Step 805 measures a respective entropy of each importance for each address vertex. That is, two address vertices may have a different importance value for a same feature and, because two address vertices may have different counts of neighboring network domains as explained earlier herein, one address vertex may have an importance for a neighbor that the other address vertex lacks. Thus, step 805 and other steps herein that process multiple importances may process different counts of importances for different address vertices. Loss due to entropy may be measured according to the following entropy formula.

$$\text{Loss\_entropy}(M) = -\text{sum}\,(s(M) \star \log(s(M)) + (1 - s(M)) \star \log(1 - s(M)))$$

The following terms have the following meanings in the above entropy formula that step 805 may apply in an embodiment.

M is a whole or partial set, as explained later herein, of importances for a particular address vertex, also referred to herein as a mask.

s( ) is sigmoid.

Step 806 penalizes a sum of multiple feature importances for an address vertex. Loss due to size may be measured according to the following size formula that step 806 may apply in an embodiment.

$$\text{Loss\_size}(M) = \text{sum}(s(M))$$

Steps 806-807 may cooperate to impose polarized sparsity that amplifies a distinction between important and unimportant features. Step 807 penalizes mid-range importances such as according to a value falling within a middle range such as defined by a distance from a median.

Step 808 calculates a first inner product of a multidomain embedding and the centroid of the cluster that contains that multidomain embedding as discussed earlier herein. Step 809 calculates an average of respective inner products of: a) respective centroids of each cluster that is not the cluster of step 808 and b) the multidomain embedding of step 808.

Step 810 measures a subtractive difference between the first inner product of step 808 and the average of inner products of step 809. Contrastive loss may be measured according to the following contrastive formula.

$$L\_contrast(v, MF, MN) = -\log(s(emb(v, FM, NM) \times cj)) -$$

$$1/(1 - K) * sum[i \mathrel{!=} j]\log(s(-emb(v, FM, NM) \times cj))$$

The following terms have the following meanings in the above contrastive formula that step 810 may apply in an embodiment.

cj is the centroid of cluster j.

FM is the fixed-width subset of importances for address features of address vertex v.

NM is the subset of importances whose width depends on a count of neighboring domain vertices of address vertex v.

emb( ) is the multidomain embedding for address vertex v, but with refinements as follows.

As explained earlier herein, values of a same domain feature are aggregated to generate a multidomain embedding. Before aggregation and embedding of neighbor domains for a multidomain embedding, each domain's value of a same domain feature is scaled by the domain's importance in neighbor mask NM. For example, domain D1 may have an importance of 0.1 and domain D2 may have an importance of 0.8. Both domains D1-D2 may demonstratively have a temperature feature and an age feature. The age and temperature of domain D1 are separately multiplied by 0.1 before domain aggregation. Likewise, the age and temperature of domain D2 are separately multiplied by 0.8 before domain aggregation. Thus, all features of a same domain have a same importance even though domain features may have different weights. Counterintuitively due to importance scaling by multiplication, domain D1 may be embedded as having a lower temperature than domain D2 even though domain D1 may actually have a higher temperature than domain D2.

Regardless of how various components of loss are measured, each address vertex may have its own address loss based on its own values of those loss components. Address loss may be measured according to the following address formula.

$$Loss\_gnn(v) = L\_contrast(v, FM, NM) + A \star Loss\_size(FM) +$$

$$B \star Loss\_size\,(NM) + C \star Loss\_entropy(FM) + D \star Loss\_entropy\,(NM)$$

The following terms have the following meanings in the above address formula that an embodiment may apply for each address vertex.

Loss_entropy( ) may be based on step 805.

Loss_size( ) may be based on step 806.

L_contrast( ) may be based on step 810.

A, B, C, and D are numbers that are respective (e.g. tunable) hyperparameters for multiplicative scaling.

For a bipartite graph, importances training should try to minimize by (e.g. iteratively) adjusting importances for some or all address vertices until training converges.

After step 810, importances training is finished. Based on importances, step 811 generates an explanation of why: a) a particular cluster or particular multidomain embedding(s) is or is not suspicious or b) a particular cluster contains or does not contain particular multidomain embedding(s). The generated explanation may contain: a) multidomain embedding (s) and/or network address(s), b) a sorting/ranking of some or all feature importances such as a top quantile or importances exceeding a value threshold. An explanation of a cluster is based on: a) the cluster's centroid and/or b) importances of address vertex(s) in the cluster but not c) importances or centroids outside of the cluster. An explanation of an address vertex is based on: a) the address vertex's cluster's centroid and/or b) importances of the address vertex but not c) importances of other address vertices other than as contributions to the centroid.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
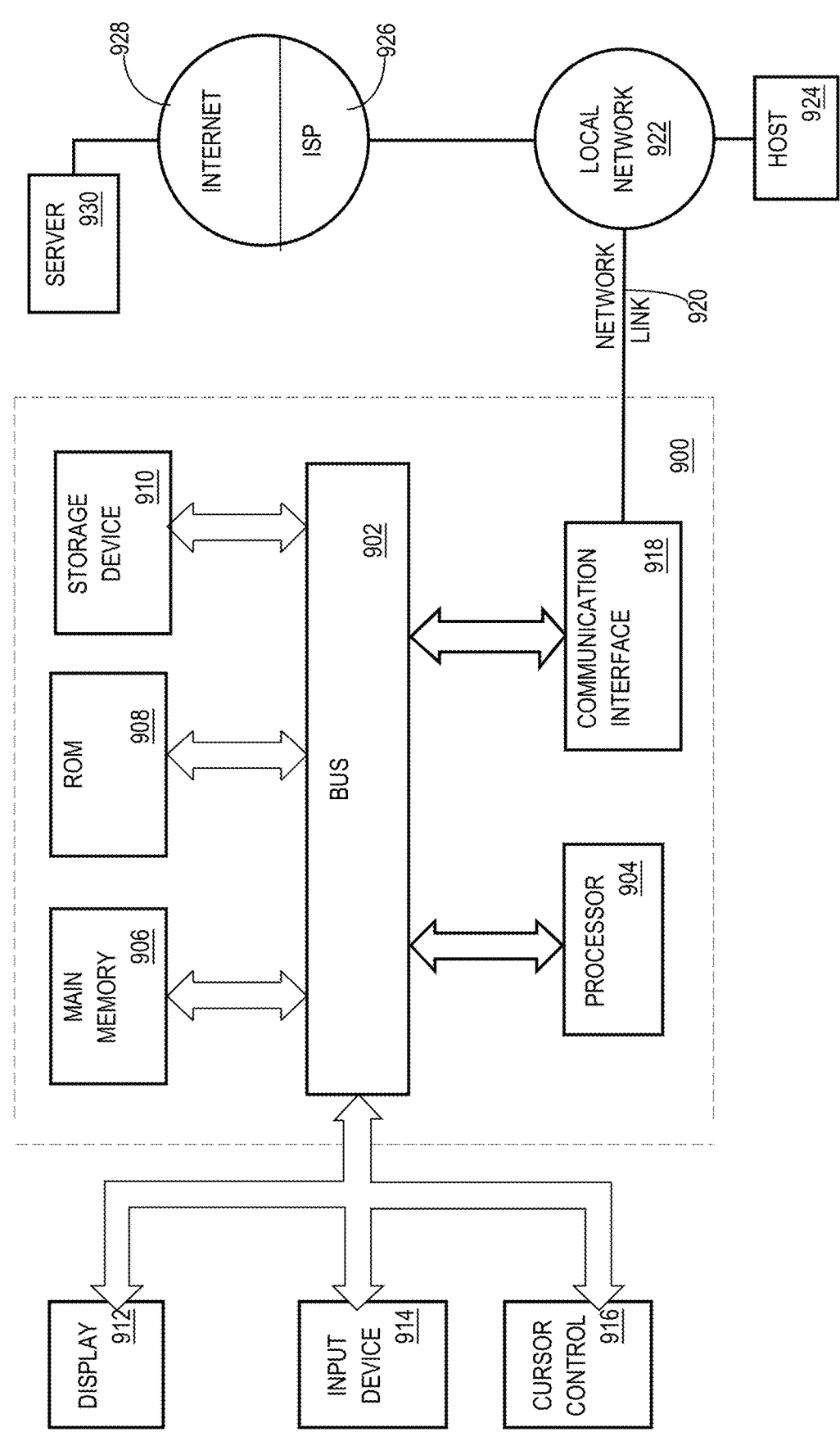
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
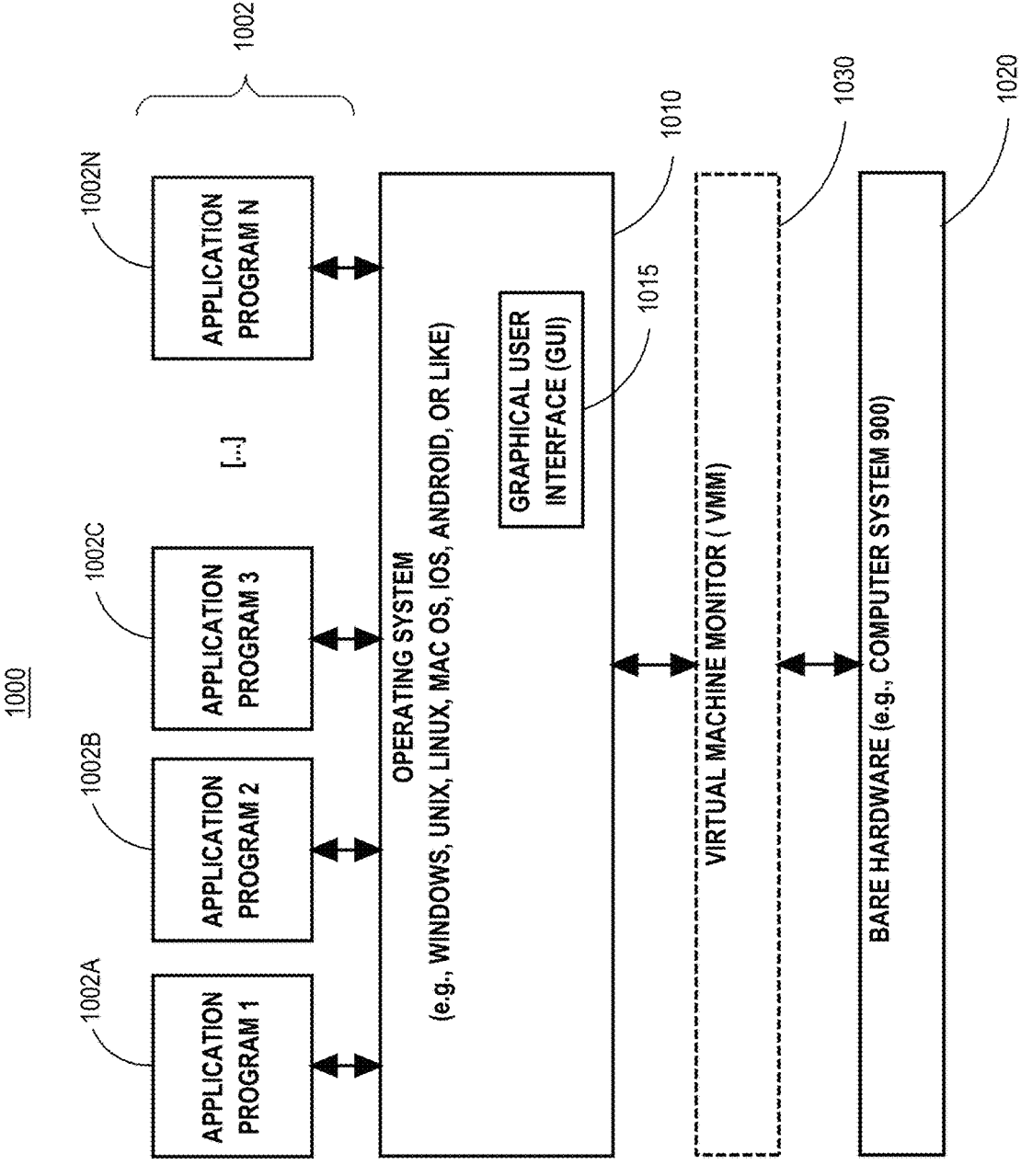
FIG. 10 is a block diagram that illustrates a basic software system that may be employed for controlling the operation of a computing system.

FIG. 10 is a block diagram of a basic software system 1000 that may be employed for controlling the operation of computing system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computing system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 900 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer $L-1$ to a layer L. Given the number of neurons in layer $L-1$ and L is $N[L-1]$ and $N[L]$, respectively, the dimensions of matrix W is $N[L-1]$ columns and $N[L]$ rows.

Biases for a particular layer L may also be stored in matrix B having one column with $N[L]$ rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer $L-1$ to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction loss is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating, by an unsupervised trained graph model, a plurality of multidomain embeddings, wherein:
each multidomain embedding of the plurality of multidomain embeddings represents a distinct network address of a plurality of network addresses, and
each multidomain embedding of the plurality of multidomain embeddings is based on a plurality of network domains that received requests from said distinct network address;
clustering the plurality of multidomain embeddings into a plurality of clusters of multidomain embeddings;
unsupervised training, based on the plurality of clusters of multidomain embeddings, a plurality of importances;
generating, based on the plurality of importances, an explanation for why an object is or is not suspicious, wherein the object is at least one selected from the group consisting of: a particular cluster of the plurality of clusters of multidomain embeddings and a particular multidomain embedding of the plurality of multidomain embeddings.

2. The method of claim 1 wherein:
the plurality of importances includes a disjoint subset of importances for each cluster of the plurality of clusters of multidomain embeddings;
said generating the explanation for said particular cluster is not based on importances for the plurality of clusters other than the particular cluster.

3. The method of claim 1 wherein said unsupervised training the plurality of importances is based on centroids of the plurality of clusters of multidomain embeddings.

4. The method of claim 1 wherein an importance of the plurality of importances corresponds to one selected from the group consisting of:
a feature of a network address of the plurality of network addresses, and
a network domain of the plurality of network domains.

5. The method of claim 1 wherein said unsupervised training the plurality of importances is based on at least one selected from the group consisting of:
a loss function that uses a centroid of a cluster of the plurality of clusters,
a loss function that uses an inner product,
a loss function that uses an entropy measurement, a loss function that penalizes a sum of multiple importances of the plurality of importances,
a loss function that penalizes mid-range importances, and
a loss function that uses multiple multidomain embeddings of the plurality of multidomain embeddings.

6. The method of claim 1 wherein said unsupervised training the plurality of importances comprises measuring a difference between:
a) an inner product of a multidomain embedding of a particular network address and a centroid of a particular cluster of the plurality of clusters that contains the multidomain embedding of the particular network address and
b) an average of respective inner products of a respective centroid of each cluster of the plurality of clusters that is not said particular cluster and the multidomain embedding of the particular network address.

7. The method of claim 1 wherein said plurality of importances consists of a respective disjoint subset of importances for each multidomain embedding of the plurality of multidomain embeddings.

8. The method of claim 7 wherein said subsets of importances for a first multidomain embedding of the plurality of multidomain embeddings and a second multidomain embedding of the plurality of multidomain embeddings consist of different counts of importances.

9. The method of claim 1 wherein a multidomain embedding of the plurality of multidomain embeddings is based on more than two domain embeddings.

10. The method of claim 1 wherein said unsupervised training the plurality of importances is based on a loss function that does not use a domain embedding.

11. One or more non-transitory computer-readable media storing instructions that, when executed by one or more processors, cause:
generating, by an unsupervised trained graph model, a plurality of multidomain embeddings, wherein:
each multidomain embedding of the plurality of multidomain embeddings represents a distinct network address of a plurality of network addresses, and
each multidomain embedding of the plurality of multidomain embeddings is based on a plurality of network domains that received requests from said distinct network address;
clustering the plurality of multidomain embeddings into a plurality of clusters of multidomain embeddings;
unsupervised training, based on the plurality of clusters of multidomain embeddings, a plurality of importances;
generating, based on the plurality of importances, an explanation for why an object is or is not suspicious, wherein the object is at least one selected from the group consisting of: a particular cluster of the plurality of clusters of multidomain embeddings and a particular multidomain embedding of the plurality of multidomain embeddings.

12. The one or more non-transitory computer-readable media of claim 11 wherein:
the plurality of importances includes a disjoint subset of importances for each cluster of the plurality of clusters of multidomain embeddings;
said generating the explanation for said particular cluster is not based on importances for the plurality of clusters other than the particular cluster.

13. The one or more non-transitory computer-readable media of claim 11 wherein said unsupervised training the plurality of importances is based on centroids of the plurality of clusters of multidomain embeddings.

14. The one or more non-transitory computer-readable media of claim 11 wherein an importance of the plurality of importances corresponds to one selected from the group consisting of:

a feature of a network address of the plurality of network addresses, and a network domain of the plurality of network domains.

15. The one or more non-transitory computer-readable media of claim 11 wherein said unsupervised training the plurality of importances is based on at least one selected from the group consisting of:

a loss function that uses a centroid of a cluster of the plurality of clusters, a loss function that uses an inner product, a loss function that uses an entropy measurement, a loss function that penalizes a sum of multiple importances of the plurality of importances, a loss function that penalizes mid-range importances, and a loss function that uses multiple multidomain embeddings of the plurality of multidomain embeddings.

16. The one or more non-transitory computer-readable media of claim 11 wherein said unsupervised training the plurality of importances comprises measuring a difference between:

a) an inner product of a multidomain embedding of a particular network address and a centroid of a particular cluster of the plurality of clusters that contains the multidomain embedding of the particular network address and b) an average of respective inner products of a respective centroid of each cluster of the plurality of clusters that is not said particular cluster and the multidomain embedding of the particular network address.

17. The one or more non-transitory computer-readable media of claim 11 wherein said plurality of importances consists of a respective disjoint subset of importances for each multidomain embedding of the plurality of multidomain embeddings.

18. The one or more non-transitory computer-readable media of claim 17 wherein said subsets of importances for a first multidomain embedding of the plurality of multidomain embeddings and a second multidomain embedding of the plurality of multidomain embeddings consist of different counts of importances.

19. The one or more non-transitory computer-readable media of claim 11 wherein a multidomain embedding of the plurality of multidomain embeddings is based on more than two domain embeddings.

20. The one or more non-transitory computer-readable media of claim 11 wherein said unsupervised training the plurality of importances is based on a loss function that does not use a domain embedding.

* * * * *